Patented Dec. 10, 1940

2,224,469

UNITED STATES PATENT OFFICE 2,224,469

GLASS COMPOSITION

Henry H. Blau, Corning, N. Y., assignor to Corning Glass Works, Corning, N. Y., a corporation of New York No Drawing. Application February 28, 1938, Serial No. 193,213

10 Claims. (Cl. 106—36.1)

This invention relates to fluorine containing glass compositions and has for its principal object to produce opal or light diffusing glasses of high reflection coefficient.

Another object is to prevent excessive loss of fluorine in melting such glasses.

The above and other objects may be accomplished by practicing my invention, which embodies among its features a light diffusing glass composition containing at least 65% of silica and also alkali oxide, alumina and at least 3% of analytically determined fluorine.

Another feature of the invention comprises a glass substantially free from boric oxide and second group oxides and containing silica, alkali oxide and at least 3% of analytically determined fluorine, the ratio of alkali oxide to alumina being between 1.85 and 3.5 and the ratio of alumina to fluorine being between 1.2 and 3.2.

Still another feature of the invention is a glass batch free from boron compounds and water and composed of compounds of silicon, alkali, aluminum and fluorine.

Prior opal glasses containing fluorine usually contain also calcium oxide or other second group oxides and/or $B_2O_3$ and the loss of fluorine in melting such glasses is excessive. The density of opacity of such glasses as represented by their reflection coefficients does not in general exceed about 70% even though large amounts of fluorine are used in the batches. Moreover the prior glasses also contain lead oxide. Opal glasses containing substantial lead oxide have a relatively low viscosity at melting temperatures and hence are quite corrosive to refractories and are not suitable for use in feeders for automatic glass working machinery.

I have discovered that if the boric oxide content of such glasses be eliminated and if the second group oxide content be eliminated, and if alumina be introduced into the glass in lieu thereof, the loss of fluorine in melting is greatly reduced and it is possible thereby to produce opaque glasses having coefficients of reflection from 75% to 85%. These results may be obtained despite the fact that my glasses contain no lead oxide.

I have also found that in fluorine containing, light diffusing glasses an excessive loss of fluorine in melting is caused by the presence of water in the batch, that is, by the use of materials containing water, such as borax, boric acid, hydrated alumina, etc. When such materials are used considerable fluorine is volatilized as hydrofluoric acid in addition to that lost as boron fluoride which is very volatile. By eliminating boron compounds from the batch and avoiding the use of batch materials containing water, a further retention of fluorine with resultant increase in opacity and economy is obtained.

My glasses possess greater opacity and higher reflection coefficients than prior glasses containing the same amount of fluorine in their batches. I have found that glasses made in accordance with my invention contain at least 3% of fluorine as analytically determined, which is substantially half of the amount that was introduced into the batch, whereas prior opal glasses will retain a substantially smaller amount of fluorine even though a larger amount were used in the batch.

The tinting or coloring of prior opal glasses is unsatisfactory in that the lack of sufficient density of opacity produces undesirable coloration and the control of the color is difficult. Glasses made in accordance with my invention are particularly suitable for tinting because they produce a more desirable coloration and are relatively easy to control.

For best results I prefer to use glasses containing only silica, alkali oxide and alumina, having at least 70% of silica and a ratio of alkali oxide to alumina between 1.85 and 3.5. In my new glasses the ratio between the percentage of alumina and the percentage of fluorine retained lies between 1.2 and 3.2 and the ratio of alkali oxide to fluorine is between 3.6 and 5.5. In general, glasses made in accordance with my invention contain 65%–80% silica, 13%–16% alkali oxide, 5%–9% alumina and at least 3% of analytically determined fluorine.

The following batches are illustrative of my invention:

|  | I | II | III | IV |
|---|---|---|---|---|
| Sand | 1000 | 1000 | 1000 | 1000 |
| Soda ash | 84 | 233 |  | 244 |
| Sodium fluoride | 212 |  | 268 |  |
| Feldspar |  | 656 |  |  |
| Alumina (calcined) | 85 |  | 121 | 47 |
| Sodium silicofluoride |  | 238 |  |  |
| Cryolite |  |  |  | 195 |

The percentage compositions on the oxide basis as calculated from the above batches are

|  | I | II | III | IV |
|---|---|---|---|---|
| $SiO_2$ | 72.2 | 72.2 | 69.5 | 70 |
| $Na_2O$ | 14.8 | 11.0 | 13.9 | 16.0 |
| $K_2O$ |  | 3.8 |  |  |
| $Al_2O_3$ | 6.1 | 6.1 | 8.3 | 6.6 |
| F | 6.9 | 6.9 | 8.3 | 7.4 |

As an example of the high retention of fluorine in my glasses the following composition is the analysis of the glass resulting from the melting of Batch I:

|       |      |
|-------|------|
| $SiO_2$ | 79.1 |
| $Na_2O$ | 13.3 |
| $Al_2O_3$ | 5.7 |
| F | 3.7 |

The above glasses are dense opals and have each a reflection coefficient of about 85%.

In the following claims the expression "alkali oxide" is used in the collective sense to mean one or more alkali oxides.

I claim:

1. A light diffusing non-borosilicate glass containing at least 65% of silica and also alkali oxide, alumina and at least 3% of analytically determined fluorine, being substantially free from second group oxides, the ratio of alkali oxides to alumina being from 1.85 to 3.5.

2. A light diffusing non-borosilicate glass containing at least 65% of silica and also alumina, alkali oxide and at least 3% of analytically determined fluorine, being substantially free from second group oxides and the ratio of alumina to fluorine being from 1.2 to 3.2.

3. A light diffusing non-borosilicate glass substantially free from second group oxides and containing silica, alkali oxide and at least 3% of analytically determined fluorine, the ratio of alkali oxide to alumina being between 1.85 and 3.5 and the ratio of alumina to fluorine being between 1.2 and 3.2.

4. A light diffusing non-borosilicate glass consisting of 65% to 80% $SiO_2$, 5% to 9% $Al_2O_3$, 13% to 16% alkali oxide and at least 3% of analytically determined fluorine, the ratio of alkali oxide to alumina being between 1.85 and 3.5.

5. A light diffusing glass substantially free from second group oxides and comprising about 79.1% $SiO_2$, 13.3% $Na_2O$, 5.7% $Al_2O_3$, and 3.7% fluorine as analytically determined.

6. A glass batch containing compounds of silicon, equivalent to at least 65% $SiO_2$, alkali metal, aluminum and fluorine and being substantially free from second group and boron compounds and water, the ratio alkali oxide to $Al_2O_3$ being between 1.85 and 3.5.

7. A glass batch containing compounds of silicon, alkali metal, aluminum and fluorine, the silicon content being equivalent to at least 65% $SiO_2$, the batch being substantially free from second group compounds, boron compounds and water and the ratio alkali oxide to $Al_2O_3$ being between 1.85 and 3.5.

8. A glass batch consisting of sand, sodium carbonate, sodium fluoride and calcined alumina, the silica content on the oxide basis being at least 70% and the ratio $Na_2O$ to $Al_2O_3$ being about 2.5.

9. A glass batch consisting of sand, soda ash, feldspar and an alkali silicofluoride, the silica content on the oxide basis being at least 70% and the ratio alkali oxide to alumina being about 2.5.

10. A glass batch consisting of sand, soda ash, calcined alumina and cryolite, the silica content on the oxide basis being about 70% and the ratio alkali oxide to alumina being about 2.5.

HENRY H. BLAU.